US012073820B2

(12) United States Patent
Ouyang et al.

(10) Patent No.: US 12,073,820 B2
(45) Date of Patent: Aug. 27, 2024

(54) CONTENT PROCESSING METHOD AND APPARATUS, COMPUTER DEVICE, AND STORAGE MEDIUM

(71) Applicant: Tencent Technology (Shenzhen) Company Limited, Guangdong (CN)

(72) Inventors: Caisheng Ouyang, Guangdong (CN); Qi Chen, Guangdong (CN); Yang Zheng, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 384 days.

(21) Appl. No.: 17/519,237

(22) Filed: Nov. 4, 2021

(65) Prior Publication Data

US 2022/0059073 A1 Feb. 24, 2022

Related U.S. Application Data

(63) Continuation of application No. PCT/CN2020/114352, filed on Sep. 10, 2020.

(30) Foreign Application Priority Data

Nov. 29, 2019 (CN) .......................... 201911200739.6

(51) Int. Cl.
*G10L 13/02* (2013.01)
*G10L 13/08* (2013.01)
(Continued)

(52) U.S. Cl.
CPC .............. *G10L 13/08* (2013.01); *G10L 13/02* (2013.01); *G10L 15/22* (2013.01); *G10L 15/30* (2013.01);
(Continued)

(58) Field of Classification Search
CPC .......... G10L 13/02; G10L 15/22; G10L 15/30
See application file for complete search history.

(56) References Cited

U.S. PATENT DOCUMENTS

| 8,984,617 B1* | 3/2015 | Fausak | H04L 63/08 |
| | | | 719/330 |
| 2008/0059197 A1* | 3/2008 | Jones | G10L 15/30 |
| | | | 704/270.1 |

(Continued)

FOREIGN PATENT DOCUMENTS

| CN | 110136703 A | 8/2019 |
| CN | 110299152 A | 10/2019 |

(Continued)

OTHER PUBLICATIONS

International Search Report mailed Dec. 2, 2020 for International Application No. PCT/CN2020/114352; 4 pages; including English translation.

(Continued)

*Primary Examiner* — Bryan S Blankenagel
(74) *Attorney, Agent, or Firm* — Crowell & Moring LLP

(57) ABSTRACT

A content processing method is provided, including: obtaining first content blocks, the first content block including structured data; transmitting, through a single bidirectional communication link established based on an application layer protocol, the first content blocks in a streaming manner according to a first sequence for obtaining the first content blocks; receiving, through the single bidirectional communication link, second content blocks returned in a streaming manner, the second content blocks being obtained by performing content type conversion on the first content blocks, transmission of the first content blocks and reception of the second content blocks being asynchronously performed via the single bidirectional communication link; and outputting (Continued)

the second content blocks sequentially according to a second sequence for receiving the second content blocks.

16 Claims, 7 Drawing Sheets

(51) Int. Cl.
    *G10L 15/22*     (2006.01)
    *G10L 15/30*     (2013.01)
    *H04L 67/141*     (2022.01)
    *H04L 67/565*     (2022.01)
    *H04L 69/329*     (2022.01)

(52) U.S. Cl.
    CPC .......... *H04L 67/141* (2013.01); *H04L 67/565* (2022.05); *H04L 69/329* (2013.01)

(56) References Cited

U.S. PATENT DOCUMENTS

2014/0122080 A1*   5/2014   Kaszczuk ............... G10L 13/02
                                                                                                        704/260
2015/0193762 A1*   7/2015   Sugiyama ............ G06Q 20/209
                                                                                                         358/1.15
2016/0048561 A1*   2/2016   Jones ................ G06F 16/24578
                                                                                                         707/722
2018/0357022 A1*  12/2018   Darcius ..................... G07G 5/00
2020/0034113 A1*   1/2020   Holst, III .............. G06F 3/0488
2020/0162433 A1*   5/2020   Subbarayan ............ H04L 67/56
2020/0412644 A1*  12/2020   Zhang ................... H04L 45/123

FOREIGN PATENT DOCUMENTS

| CN | 110491370 A | 11/2019 |
| CN | 110971685 A | 4/2020 |
| WO | WO 2002/089114 A1 | 11/2002 |

OTHER PUBLICATIONS

Written Opinion mailed Dec. 2, 2020 for International Application No. PCT/CN2020/114352; 4 pages.

\* cited by examiner

CONTENT PROCESSING METHOD AND APPARATUS, COMPUTER DEVICE, AND STORAGE MEDIUM

RELATED APPLICATION

This application is a continuation of and claims priority to the International PCT Application No. PCT/CN2020/114352, filed with the China National Intellectual Property Administration, PRC on Sep. 10, 2020, which claims priority to Chinese Patent Application No. 201911200739.6, filed with the China National Intellectual Property Administration on Nov. 29, 2019, each of which is incorporated herein by reference in its entirety.

FIELD OF THE TECHNOLOGY

This application relates to the field of computer technologies and the field of artificial intelligence (AI) technologies, and in particular, to a content processing method and apparatus, a computer device, and a storage medium.

BACKGROUND OF THE DISCLOSURE

With the rapid development of science and technologies, processing content online has become a relatively mainstream manner. Many application scenarios include online content processing. For example, in a speech recognition application scenario, speech content is recognized and processed online.

During online content processing, online content transmission is generally included. In a conventional method, a communication link is established based on an underlying protocol. In this case, only binary data can be transmitted during data transmission. The binary data cannot be directly recognized. Therefore, relatively complex conversion processing needs to be performed on the binary data, resulting in necessary consumption of system resources.

SUMMARY

According to various embodiments provided in this application, a content processing method and apparatus, a computer device, and a storage medium are provided.

According to one aspect of this application, a content processing method is provided, performed by a computer device, the method including:
  obtaining first content blocks, the first content block being structured data;
  transmitting, through a single bidirectional communication link established based on an application layer protocol, the first content blocks in a streaming manner according to a first sequence of obtaining the first content blocks;
  receiving, through the single bidirectional communication link, second content blocks returned in a streaming manner, the second content blocks being obtained by performing content type conversion on the first content blocks, transmitting of the first content blocks and receiving of the second content blocks being asynchronously performed in the single bidirectional communication link; and
  outputting the second content blocks sequentially according to a second sequence of receiving the second content blocks.

According to one aspect of this application, a content processing apparatus is provided, disposed in a computer device, the apparatus including:
  an obtaining module, configured to obtain first content blocks, the first content block being structured data;
  a streaming transmission module, configured to transmit, through a single bidirectional communication link established based on an application layer protocol, the first content blocks in a streaming manner according to a first sequence of obtaining the first content blocks; and receive, through the single bidirectional communication link, second content blocks returned in a streaming manner, the second content blocks being obtained by performing content type conversion on the first content blocks, transmitting of the first content blocks and receiving of the second content blocks being asynchronously performed in the single bidirectional communication link; and
  an output module, configured to output the second content blocks sequentially according to a second sequence of receiving the second content blocks.

A computer device is provided, including a memory and one or more processors, the memory storing computer-readable instructions, the computer-readable instructions, when executed by the one or more processors, causing the one or more processors to perform operations of the content processing method according to the embodiments of this disclosure.

One or more non-transitory computer-readable storage mediums are provided, storing computer-readable instructions, the computer-readable instructions, when executed by one or more processors, causing the one or more processors to perform operations of the content processing method according to the embodiments of this disclosure.

Details of one or more embodiments of this disclosure are provided in the accompanying drawings and descriptions below. Based on the specification, the accompanying drawings, and the claims of this application, other features, objectives, and advantages of this application become clearer.

BRIEF DESCRIPTION OF THE DRAWINGS

To describe the technical solutions of the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from the accompanying drawings without creative efforts.

DESCRIPTION OF EMBODIMENTS

To make the objectives, technical solutions, and advantages of this application clearer, the following further describes this disclosure in detail with reference to the accompanying drawings and the embodiments. It is to be understood that the specific embodiments described herein are merely used to explain this disclosure but are not intended to limit this disclosure.

Figure 1:
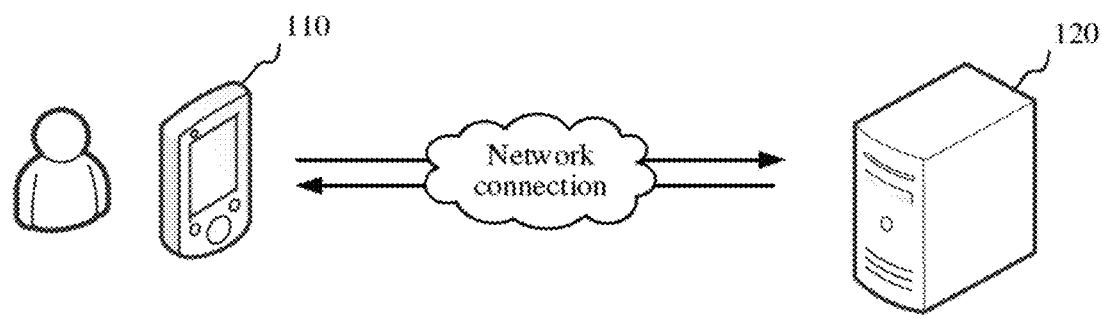
FIG. 1 is a diagram of an example application scenario of a content processing method according to an embodiment.

FIG. 1 is a diagram of an application scenario of a content processing method according to an embodiment. Referring to FIG. 1, the application scenario includes a terminal 110 and a server 120 that are connected by a network. The terminal 110 may be a smart TV, a smart speaker, a desktop computer, or a mobile terminal, and the mobile terminal may include at least one of a mobile phone, a tablet computer, a notebook computer, a personal digital assistant, and a wearable device. The server 120 may be implemented by an independent server or a server cluster that includes a plurality of physical servers.

A user may enter initial content through the terminal 110. The terminal 110 may structure the entered initial content, to generate first content blocks belonging to structured data. A single bidirectional communication link is established between the terminal 110 and the server 120 based on an application layer protocol. The terminal 110 may transmit, through the single bidirectional communication link, first content blocks in a streaming manner to the server 120 according to a first sequence, where the first sequence is the sequence of obtaining the first content blocks. The server 120 may perform content type conversion on the first content blocks, to obtain second content blocks. The server 120 may return the second content blocks in a streaming manner to the terminal 110. The processing that the terminal 110 transmits the first content block to the server 120 and the processing that the server 120 returns the second content blocks to the terminal 110 are both performed in the single bidirectional communication link and are asynchronously performed without interfering with each other. The terminal 110 may output the second content blocks sequentially according to a second sequence, where the second sequence is the sequence of receiving the second content blocks. For example, the terminal 110 may display or play the second content blocks, or output the second content blocks in another form.

Figure 2:
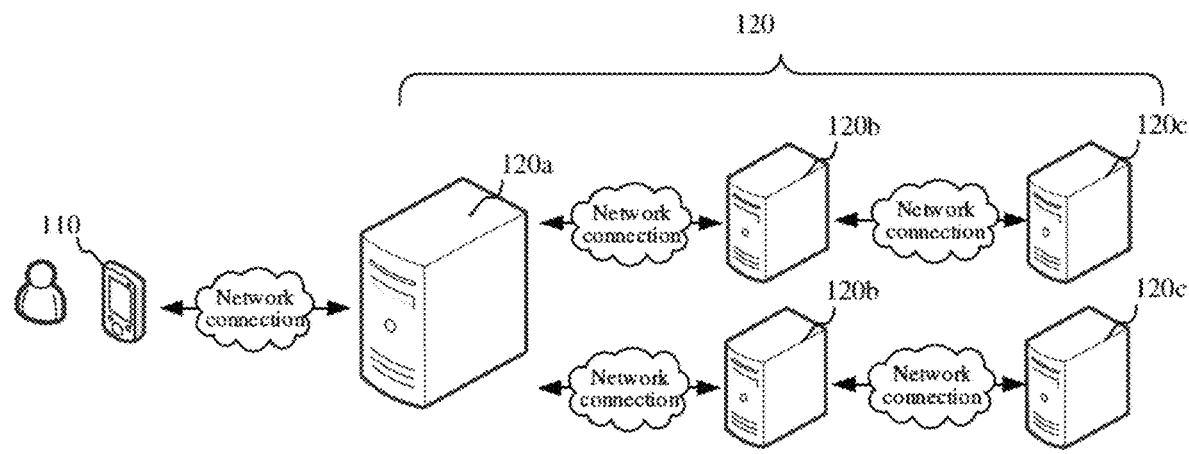
FIG. 2 is an example diagram of an example application scenario of a content processing method according to another embodiment.

In an embodiment, as shown in FIG. 2, the server 120 includes a proxy server 120a, adapter servers 120b, and decoder servers 120c. A single bidirectional communication link may be established between the terminal 110 and the proxy server 120a based on an application layer protocol. The terminal 110 may transmit, according to the first sequence of obtaining the first content blocks, the first content blocks in a streaming manner to the proxy server 120a. The proxy server 120a may transmit the first content blocks to the adapter servers 120b. The adapter servers 120b may logically adapt and convert the first content blocks, and distribute the adapted and converted content blocks to the decoder servers 120c. The decoder server 120c may perform content type conversion on the first content blocks, to obtain second content blocks. The decoder servers 120c may return the second content blocks in a streaming manner through the adapter servers 120b and the proxy server 120a in sequence, to the terminal 110. The terminal 110 may output the second content blocks sequentially according to a second sequence of receiving the second content blocks.

When the proxy server 120a and the decoder servers 120c can directly communicate with each other without adaptation and conversion, the adapter servers 120b may be omitted.

It may be understood that, the content processing method in the embodiments of this disclosure is equivalent to automatically performing content type conversion and outputting by using an AI technology.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

It may be understood that, the content processing method in the embodiments of this disclosure may be applied to a speech processing scenario such as speech recognition or text to speech (TTS). Key technologies of the speech technology include an automatic speech recognition (ASR) technology, a TTS technology, and a voiceprint recognition technology. To make a computer capable of listening, seeing, speaking, and feeling is the future development direction of human-computer interaction, and speech has become one of the most promising human-computer interaction methods in the future.

Figure 3:
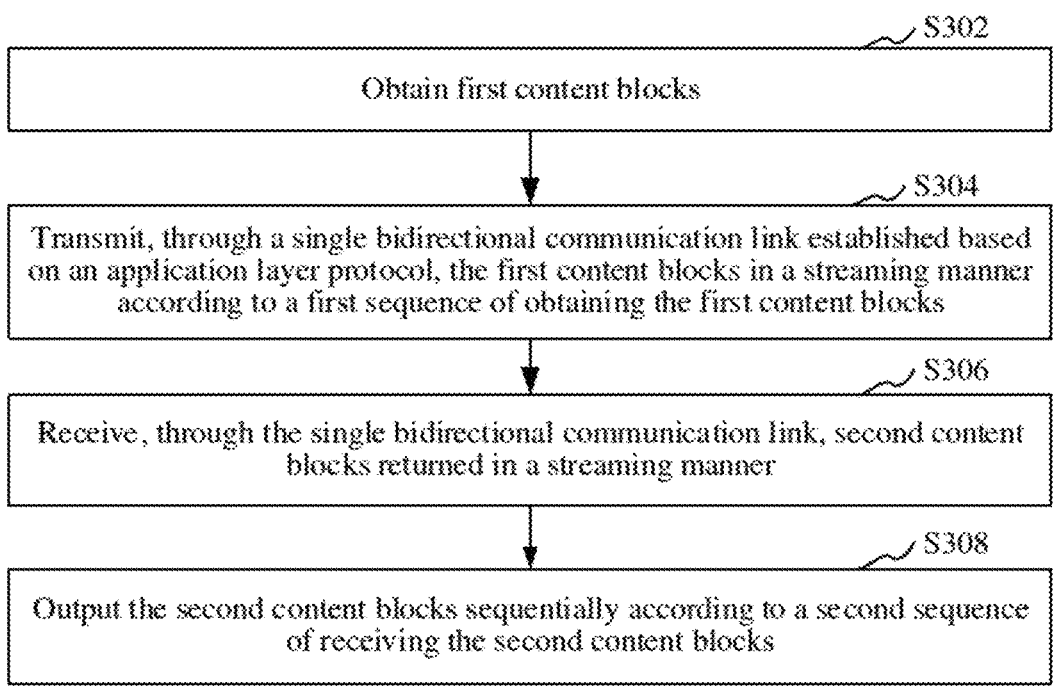
FIG. 3 is an example schematic flowchart of a content processing method according to an embodiment.

FIG. 3 is a schematic flowchart of a content processing method according to an embodiment. The content processing method in this embodiment may be applied to a computer device. An example in which the computer device is the terminal 110 in FIG. 1 is mainly used for description. Referring to FIG. 3, the method specifically includes the following steps:

S302: Obtain first content blocks.

The first content blocks are structured data. Structured data (struct data) refers to structured data obtained after initial data is encapsulated, and can be directly recognized and used at the application layer without further data format conversion.

In an embodiment, a computer device can obtain first content blocks in a streaming manner. A streaming manner means continuously. Obtaining first content blocks in a streaming manner means obtaining first content blocks continuously.

It may be understood that the first content blocks are equivalent to a part of a data stream. In this embodiment of this disclosure, instead of obtaining a complete piece of content and then transmitting the content, first content blocks are obtained while being transmitted, which is a real-time, streaming transmission process.

For example, while speech data is acquired in a streaming manner, the speech data is structured and then transmitted, instead of recording a complete piece of audio, then transmitting the audio. The above is equivalent to performing recognition while speaking. When a user speaks, segmented speech recognition is performed, therefore spoken text can be returned without needing all of the speech.

In an embodiment, the computer device can directly obtain first content blocks belonging to structured data.

In an embodiment, the computer device may alternatively obtain initial content, and perform structured encapsulation processing on initial content to generate first content blocks belonging to structured data.

In an embodiment, the computer device can directly obtain initial content.

In an embodiment, step S302 includes: receiving a trigger instruction; obtaining initial content in response to the trigger instruction; and structuring the initial content, to generate first content blocks.

The trigger instruction is a trigger for obtaining initial content. That is, after being triggered, the computer device obtains initial content.

In an embodiment, the trigger instruction may include either an instruction for speech recognition or an instruction for speech generation.

In an embodiment, the computer device may first preprocess the initial content, and perform structured encapsulation processing on the preprocessed content, to generate first content blocks. It may be understood that, preprocessing refers to a process of extracting target content from initial content. In this case, structured encapsulation processing may be performed on target content extracted during preprocessing, to encapsulate the target content into first content blocks. Target content refers to content on which content type conversion is to be performed.

Initial content refers to content that is not structured. Content refers to data that can convey information.

In an embodiment, content may include at least one of text content, media content, and the like. Media content refers to content conveyed through a medium. In an embodiment, media content may include at least one of audio content, video content, picture content, and the like.

S304: Transmit, through a single bidirectional communication link established based on an application layer protocol, the first content blocks in a streaming manner according to a first sequence of obtaining the first content blocks.

The single bidirectional communication link is a single link used for performing bidirectional streaming communication. That is, bidirectional streaming transmission can be implemented in one link. Bidirectional streaming transmission refers to asynchronously receiving and transmitting data in a streaming manner between two ends. That is, one end may transmit data to the other end in a streaming manner, and may receive data from the other end in a streaming manner. It may be understood that, "asynchronous" means that receiving of data and transmitting of data are independent of each other and do not interfere with each other.

An application layer protocol defines specifications for application programs running on different end systems to transfer messages between each other. It may be understood that, in the embodiments of this disclosure, the application layer protocol is an application layer protocol used for establishing a single bidirectional communication link instead of generally referring to all application layer protocols. Because some application layer protocols (for example, the HyperText Transfer Protocol (HTTP) protocol) cannot be used for establishing a single bidirectional communication link.

It may be understood that, the computer device may establish a single bidirectional communication link in advance based on an application layer protocol before obtaining first content blocks. The computer device may alternatively trigger to establish a single bidirectional communication link based on an application layer protocol after obtaining first content blocks. An occasion of establishing a single bidirectional communication link is not limited provided that a single bidirectional communication link can be established before first content blocks are transmitted in a streaming manner.

In an embodiment, the computer device may directly establish a single bidirectional communication link based on an existing application layer protocol. In an embodiment, the existing application layer protocol used for establishing a single bidirectional communication link may include the WebSocket protocol.

The WebSocket protocol is a protocol of performing full-duplex communication over a single Transmission Control Protocol (TCP) connection.

In another embodiment, the computer device may alternatively establish a single bidirectional communication link based on another existing application layer protocol.

In an embodiment, the computer device may perform protocol encapsulation on the TCP protocol or a multi-link application layer protocol, to generate the application layer protocol used for establishing the single bidirectional communication link.

Transmission Control Protocol (TCP) is a connection-oriented byte stream-based transport layer communication protocol.

The multi-link application layer protocol is an application layer protocol used for implementing bidirectional communication by establishing at least two links. That is, the multi-link application layer protocol itself cannot be used for establishing a single bidirectional communication link.

In an embodiment, the computer device may perform protocol encapsulation at an upper layer of the TCP, to generate the application layer protocol used for establishing the single bidirectional communication link.

In an embodiment, the computer device may alternatively perform protocol encapsulation for a multi-link application layer protocol, to generate the application layer protocol used for establishing the single bidirectional communication link. For example, the HTTP protocol is a multi-link application layer protocol. The computer device may perform protocol encapsulation on the HTTP protocol, and encapsulate the HTTP protocol into an application layer protocol used for establishing a single bidirectional communication link.

The first sequence is a sequence of obtaining the first content blocks. It may be understood that, because the computer device obtains the first content blocks in a streaming manner, the obtained first content blocks have a sequence, that is, the first sequence.

Transmitting the first content blocks in a streaming manner refers to transmitting the first content blocks continuously. For example, after obtaining a first content block, the computer device transmits the first content block, and then, obtains a next first content block and transmits the next first content block. In this way, the computer device transmits the first content blocks continuously, thereby transmitting the first content blocks in a streaming manner.

It may be understood that, the first content blocks are obtained, and the first content blocks are transmitted in a streaming manner according to the first sequence. The entire process is continuous and is equivalent to obtaining first content blocks while transmitting the first content blocks.

S306: Receive, through the single bidirectional communication link, second content blocks returned in a streaming manner.

The second content blocks are obtained by performing content type conversion on the first content blocks. A content type is used for representing a presentation form of content. Transmitting of the first content blocks and receiving of the second content blocks are asynchronously performed in the single bidirectional communication link. The second content blocks returned in a streaming manner are second content blocks returned continuously.

In an embodiment, a content type may include at least one of audio, a video, text, and a picture. The picture may include at least one of a static picture and a motion picture.

It may be understood that, the first content block and the second content block belong to different content types. For example, the first content block is audio data, and content type conversion may be performed on the first content block through speech recognition, to generate a text content block corresponding to the audio data. The audio data and the text content block belong to different content types.

Specifically, after the computer device transmits the first content blocks in a streaming manner to the server, the server may perform content type conversion on the first content blocks, to generate second content blocks, and return the second content blocks to the computer device in a streaming manner.

It may be understood that, the single bidirectional communication link is established between the computer device and the server.

S308: Output the second content blocks sequentially according to a second sequence of receiving the second content blocks.

The second sequence is a sequence of receiving the second content blocks. It may be understood that, because the second content blocks are returned in a streaming manner, the computer device receives the second content block continuously, so that the received second content blocks have a sequence, that is, the second sequence.

Specifically, the computer device may output the second content blocks sequentially according to the second sequence. It may be understood that, a second content block that is received earlier is outputted before a second content block that is received later. That is, a second content block that is received earlier is outputted earlier than a second content block that is received later.

In the content processing method, first content blocks belonging to structured data are transmitted in a streaming manner in a single bidirectional communication link established based on an application layer protocol, and second content blocks returned in a streaming manner are received, the second content blocks being obtained by performing content type conversion on the first content blocks. The second content blocks are outputted sequentially according to a second sequence of receiving the second content blocks. Because transmitting of the first content blocks and receiving of the second content blocks are asynchronously performed in the single bidirectional communication link, so that bidirectionally transmitting structured content in a streaming manner in a same communication link, compared with binary data, no additional data conversion is needed, thereby saving system resources.

In addition, because a conventional method is based on an underlying protocol, there may be cases that some application scenarios are not supported (for example, access of an applet or HTML5 is not supported). However, the single bidirectional communication link established based on an application layer protocol can support application scenarios that cannot be supported in the conventional method, thereby improving applicability, and in addition, avoid an error caused by the problem of not supporting the application scenarios, thereby improving the accuracy of content processing. In addition, waste of system resources caused by the error generated because the application scenarios are not supported is also avoided.

Further, the communication link established based on the underlying protocol in the conventional method needs to be established based on a fixed IP address. In this case, when traffic is relatively large, there is restrictions due to insufficient IP addresses. The solutions of this disclosure are not restricted by the fixed IP address. When traffic is relatively large, proper adaptation and distribution can still be performed through balanced shunt processing.

Finally, establishing a single bidirectional communication link based on an application layer protocol can implement streaming transmission of uplink and downlink data through the same link, thereby achieving stable bidirectional streaming transmission, avoiding a synchronization failure problem that is likely to occur during multi-link transmission, which not only improves accuracy, but also avoids system resource consumption caused by multi-link transmission.

In an embodiment, the trigger instruction is an instruction for performing speech recognition, and the obtaining initial content in response to the trigger instruction includes: acquiring audio data in response to the speech recognition instruction. In this embodiment, the preprocessing the initial content, to extract target content from the initial content includes: extracting target speech data from the acquired audio data. The structuring the target content, to generate the first content blocks includes: structuring the target speech data, to generate speech data blocks as the first content blocks.

Automatic speech recognition (ASR) refers to a processing process of converting speech data into text content.

The speech recognition instruction is an instruction used for triggering speech recognition. In an embodiment, a speech recognition instruction may include an instruction for directly triggering speech recognition and an instruction for indirectly triggering speech recognition.

The instruction for directly triggering speech recognition is an instruction dedicated for triggering speech recognition. That is, the instruction is dedicated for triggering speech recognition.

The instruction for indirectly triggering speech recognition, and triggers speech recognition in a process of triggering generation of a target instruction. In an embodiment, the instruction for directly triggering speech recognition may include a speech search instruction. The speech search instruction is an instruction used for performing an information search according to speech data. It may be understood that in a speech search process, a speech needs to be recognized, which may indirectly trigger speech recognition.

Audio data is digitized sound data. The target speech data is speech data that needs to be converted into text content. It may be understood that, the target speech data is speech data in audio data other than an interfering speech. The interfering speech is speech data that does not need to be converted into text content.

In an embodiment, the interfering speech may include at least one of environment sound data and speech data of a non-target object. The non-target object is an object other than the target object that provides the target speech data.

Specifically, the user may enter a speech recognition instruction to the computer device, and the computer device may establish a single bidirectional communication link based on an application layer protocol in response to the speech recognition instruction. A user may start to speak, and the computer device may acquire audio data. The computer device may preprocess the audio data, and extract target speech data from the audio data. The computer device may structure the target speech data, to generate speech data blocks as the first content blocks.

It may be understood that, the computer device generates speech data blocks while receiving audio data, which is a streaming processing process, instead of generating speech data blocks after a complete video is recorded.

In an embodiment, a client is installed on the computer device, and a software development kit (SDK) is pre-installed on the client.

The client is a client with an audio acquisition portal. It may be understood that, the client may be a client that needs to achieve its own characteristics through the audio acquisition portal or a client that has audio acquisition as an auxiliary function and that has an additionally integrated audio acquisition portal.

In an embodiment, the client may include at least one of a client of a content playback platform, a signal receiver of a smart home device (for example, a set top box), an instant messaging client, and the like.

The client of a content playback platform may include at least one of a video playback client, an audio playback client, and the like.

Smart home (home automation) integrates, with a residential as a platform, home life-related facilities by using comprehensive wiring technologies, network communication technologies, security technologies, automatic control technologies, and audio and video technologies. In an embodiment, the smart home device includes at least one of a smart television, a smart speaker, and a smart air-conditioner.

Specifically, the user may perform a speech recognition operation on the client, to enter a speech recognition instruction, and the client may invoke, in response to the speech recognition instruction, an installed SDK to start speech recognition. When the computer device performs speech recognition by using the SDK, a single bidirectional communication link between the computer device and the server is established based on an application layer protocol.

In an embodiment, an interface on the client may display a speech recognition trigger control. When a speech recognition instruction generated by triggering the speech recognition trigger control is received, a speech search interface is jumped to, to acquire audio data, and the single bidirectional communication link is established based on an application layer protocol. when that audio data is acquired, preprocessing is performed on the audio data, and target speech data is extracted from the audio data. The computer device may structure the target speech data through the client, to generate speech data blocks as the first content blocks. Then, speech data blocks are transmitted to the server through the single bidirectional communication link for speech recognition. The speech search interface is an interface for searching for media content based on speech data.

In an embodiment, the method further includes: splicing and combining the displayed second content blocks according to the second sequence, to generate a search statement; searching, according to the search statement, for media content matching the search statement; and displaying the found media content.

In an embodiment, media content may include at least one of audio content, video content, picture content, and the like.

Specifically, the computer device may splice and combine the displayed second content blocks according to a sequence (that is, the second sequence) according to which the second content blocks are received, to generate a complete search statement. The computer device, according to the search statement, may search for media content matching the search statement, and display the media content.

It may be understood that, the computer device may display the media content in at least one of a picture form and a text form.

In an embodiment, the computer device may invoke an SDK to establish a single bidirectional communication link between the client and the proxy server based on an application layer protocol. The proxy server is a server configured to establish a link with a client and perform traffic distribution.

The user starts to speak, and the computer device may acquire audio data. The computer device may preprocess the audio data, and extract target speech data from the audio data. The computer device may structure the target speech data, to generate speech data blocks as the first content blocks.

In an embodiment, the computer device may perform at least one of the following preprocessing on audio data: denoising, activity detection, compression, and the like, to obtain the target speech data.

In an embodiment, the second content blocks are text content blocks obtained by performing speech recognition on the speech data blocks. The outputting the second content blocks sequentially according to a second sequence of receiving the second content blocks includes: displaying the text content blocks sequentially on the interface according to the second sequence of receiving the text content blocks.

It may be understood that, speech recognition is equivalent to content type conversion.

Displaying the text content blocks sequentially on the interface according to the second sequence is displaying the text content blocks sequentially on the interface according to the second sequence of receiving the text content blocks. It may be understood that displaying the text content blocks is displaying the part of text content.

Figure 4:
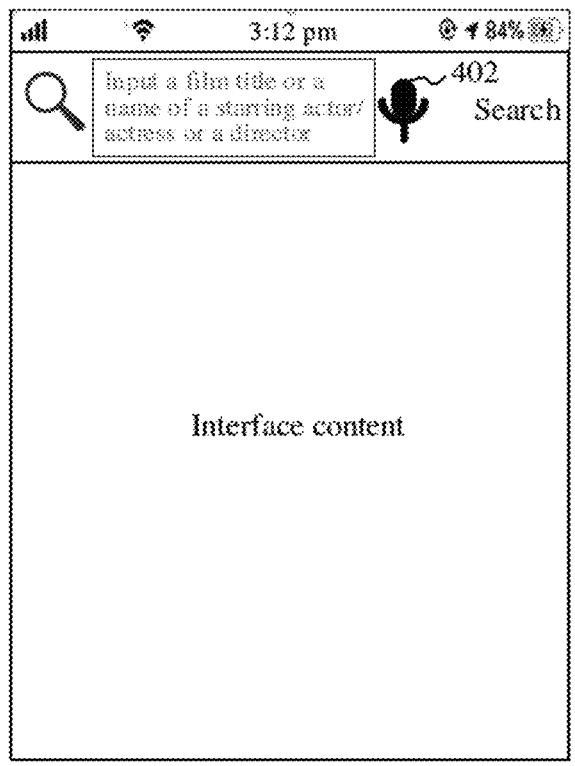
FIG. 4 to FIG. 7 are example schematic diagrams of interfaces for speech recognition according to an embodiment.
Figure 5:
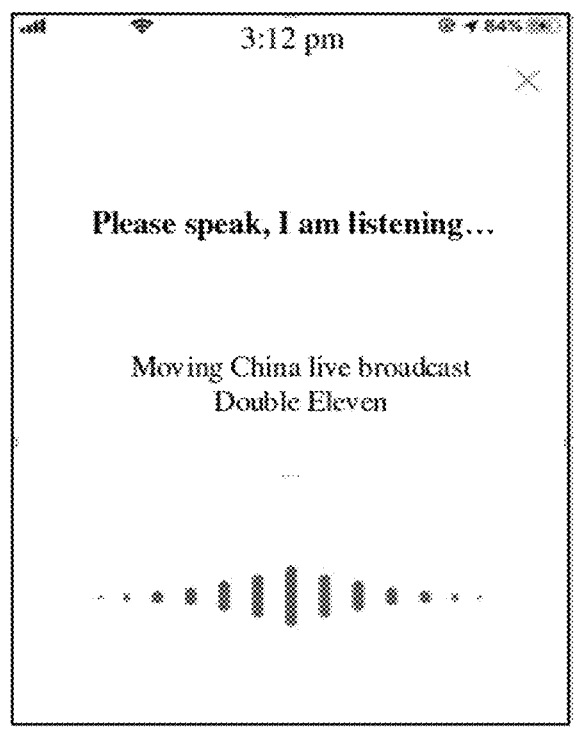
Figure 6:
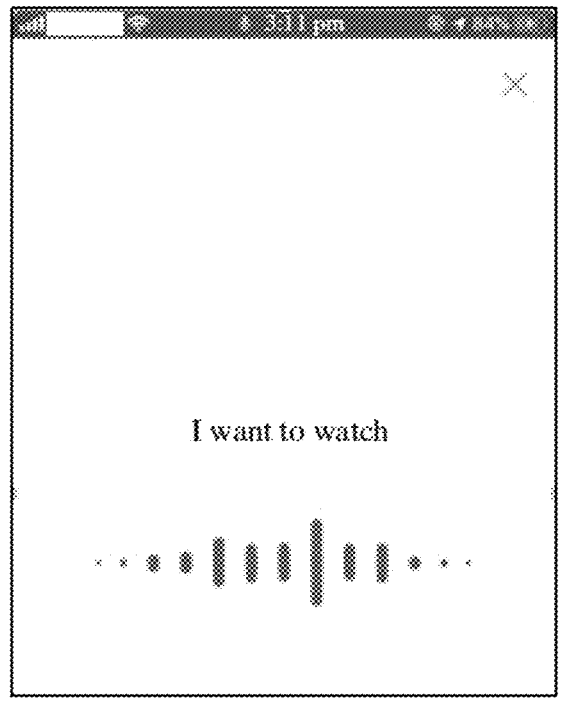
Figure 7:
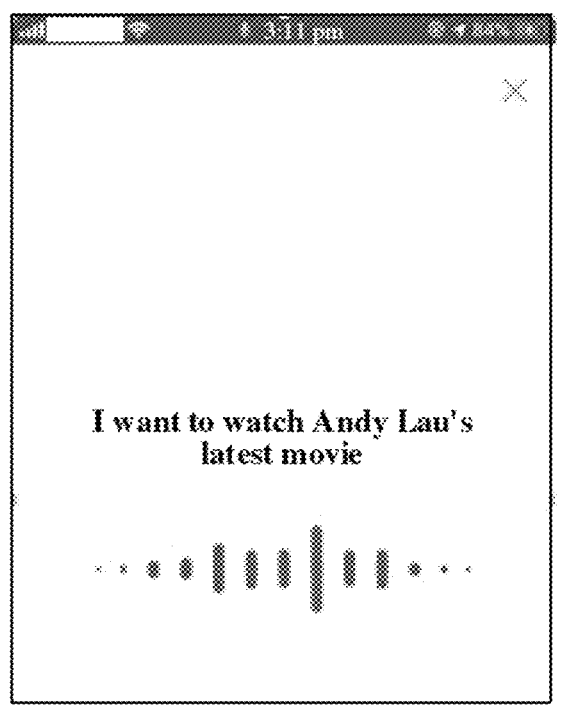

FIG. 4 to FIG. 7 are schematic diagrams of interfaces for speech recognition according to an embodiment. Descriptions are made by using an example in which a client is a video client. Referring to FIG. 4, there is an audio button 402 (that is, the speech recognition trigger control) near a search box of the video client. A user may click or tap the audio button to enter a speech search interface. FIG. 5 shows the speech search interface, and an SDK is invoked to establish a single bidirectional communication link. The user may speak. It is assumed that the user says "I want to watch Andy Lau's latest movie". In this case, audio data can be acquired through the speech search interface, and speech data blocks are generated. The client may transmit the speech data blocks through the single bidirectional communication link to the server, and the server performs speech recognition on the speech data blocks, and returns recognized text content blocks in a streaming manner. The client may display the text content blocks sequentially on the interface according to a sequence of receiving the text content blocks. It may be understood that, because the speech data blocks are transmitted in a streaming manner and the text content blocks are received in a streaming manner, while the user speaks, the speech of the user is recognized and converted into text, so that while the user speaks, corresponding text content appears on the speech search interface. As shown in FIG. 6, when the user only says "I want to watch", and does not finish the complete sentence "I want to watch Andy Lau's latest movie", "I want to watch" can be transmitted as one speech data block, and then, a text content block "I want to watch" that is recognized is displayed on the speech search interface. FIG. 7 shows sequentially displaying text content blocks returned in a streaming manner, to obtain final text content "I want to watch Andy Lau's latest movie".

Figure 8:
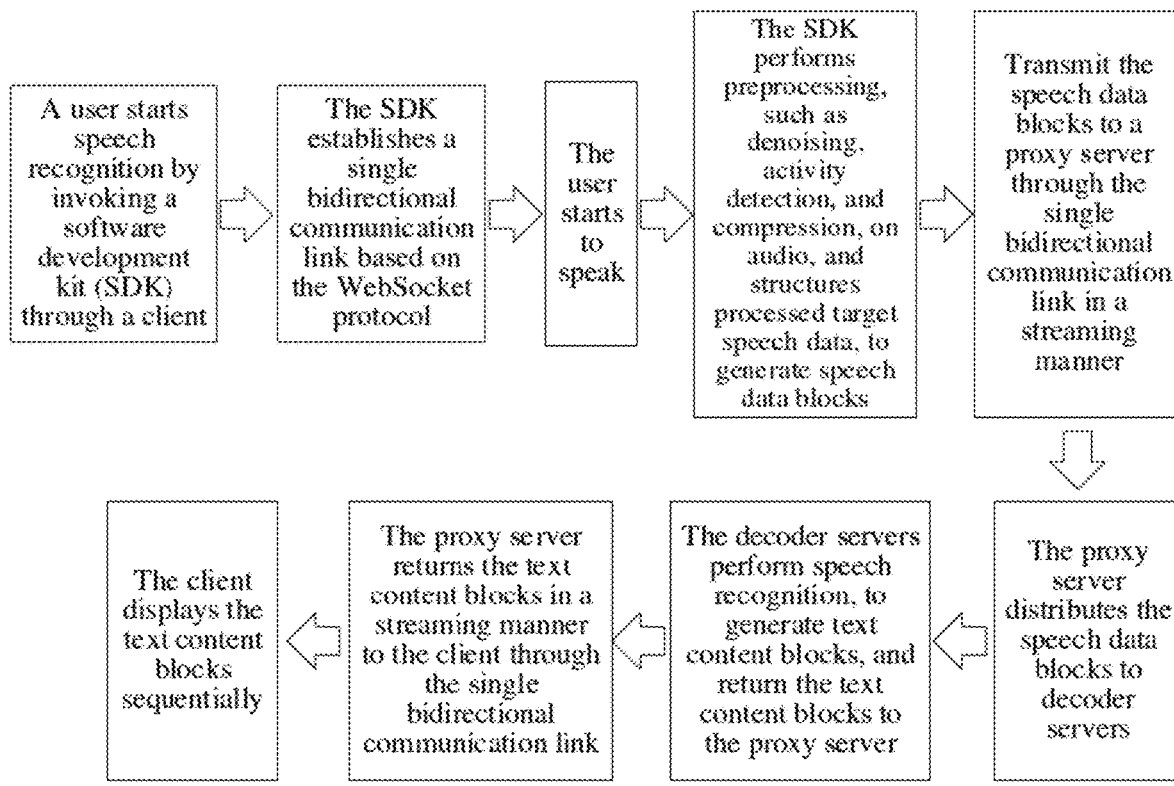
FIG. 8 is a brief flowchart of content processing according to an embodiment.

FIG. 8 is a brief flowchart of content processing according to an embodiment. Referring to FIG. 8, descriptions are made by using an example in which the application layer protocol is the WebSocket protocol. A user starts speech recognition through a client (app), and invokes an SDK through the client and starts speech recognition. When the SDK starts speech recognition, a single bidirectional communication link is first established between the client and a proxy server based on the WebSocket protocol, for streaming transmission of uplink speech data and downlink text content that is recognized and converted. "Uplink" means that a client transmits information to a network. "Downlink" means that information is received from a network to a client. Then, when the user starts to speak, the SDK starts to acquire audio data, and perform processing, such as denoising, activity detection, and compression, on the audio data, to obtain target speech data. Subsequently, the target speech data is structured, to generate speech data blocks. The computer device may transmit the speech data blocks in a streaming manner to the proxy server through the single bidirectional communication link, and the proxy server distributes the speech data blocks to decoder servers. The decoder servers perform speech recognition on the speech data blocks, to generate text content blocks. The decoder servers return the text content blocks to the proxy server. The proxy server returns the text content blocks in a streaming manner to the client through the single bidirectional communication link. The client displays the text content blocks sequentially on the interface according to a second sequence of receiving the text content blocks.

Figure 9:
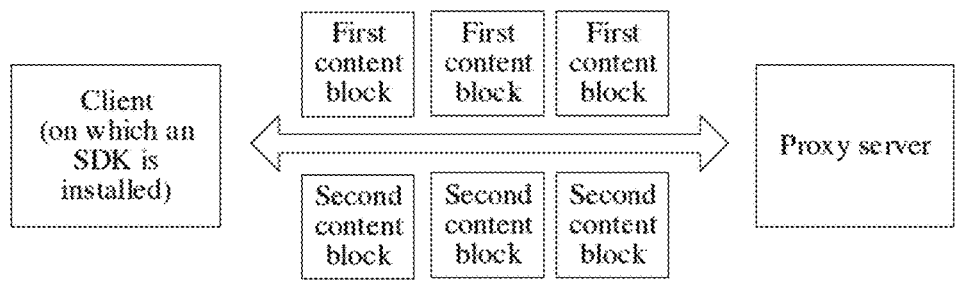
FIG. 9 is an example schematic diagram of streaming transmission according to an embodiment.

FIG. 9 is a schematic diagram of streaming transmission according to an embodiment. Referring to FIG. 9, a single bidirectional communication link is established between a client and a proxy server. Speech data blocks transmitted by the client and text content blocks (that is, results) returned by the proxy server are all transmitted in the single bidirectional communication link. In addition, the transmitting and the returning are performed asynchronously.

In this embodiment, bidirectional streaming transmission of structured speech recognition-related data can be implemented through the single bidirectional communication link established based on an application layer protocol, thereby saving system resources while ensuring the stability of transmission.

In an embodiment, the trigger instruction is an instruction for performing TTS conversion. The obtaining initial content in response to the trigger instruction includes: obtaining entered text content in response to the TTS instruction. In this embodiment, the structuring the initial content, to generate the first content blocks includes: structuring the text content, to generate text content blocks as the first content blocks.

Text to speech (TTS) refers to a processing process of converting text to corresponding audio.

It may be understood that, in this embodiment, the second content blocks are speech data blocks obtained by performing TTS on the text content blocks. The outputting the second content blocks sequentially according to a second sequence of receiving the second content blocks includes: playing the speech data blocks sequentially according to the second sequence of receiving the speech data blocks.

Specifically, a user may enter text content to a computer device. The computer device may structure, in a process in which the user enters text content, text content that has been entered, to generate text content blocks. The computer device may transmit the text content blocks to the server through the single bidirectional communication link in a streaming manner. The server may perform TTS on the text content blocks, to generate text content blocks corresponding to the speech data blocks. The server may return the generated speech data blocks in a streaming manner to the computer device. The computer device may play the speech data blocks sequentially according to the second sequence of receiving the speech data blocks.

It may be understood that, in this embodiment, the above is equivalent to generating speech data blocks while text content is entered. That is, a speech is outputted while text is entered, which is a streaming processing process instead of requiring complete text content to be entered before the text content is synthesized into a speech.

In an embodiment, the obtained speech data blocks are obtained through TTS by converting the text content blocks based on a preset sound template.

The preset sound template is a pre-established sound template. That is, the speech data blocks are obtained through a speech data block generation step. The speech data block generation step includes converting the text content blocks based one a preset sound template, and synthesizing speech data blocks matching sound characteristics of the preset sound template.

For example, the preset sound template is a sound template of a specific game character. In this case, the speech data blocks match sound characteristics of the game character, which is equivalent to saying the text content by using the game character.

In this embodiment, bidirectional streaming transmission of structured TTS-related data can be implemented through the single bidirectional communication link established based on an application layer protocol, thereby saving system resources while ensuring the stability of transmission.

In an embodiment, the method further includes: obtaining the application layer protocol; and establishing the single bidirectional communication link between a local end and a proxy server based on the application layer protocol, the single bidirectional communication link being a single link used for performing bidirectional streaming communication.

It may be understood that, the application layer protocol is an existing application layer protocol used for establishing a single bidirectional communication link. The application layer protocol may alternatively be obtained by performing protocol encapsulation based on a communication protocol that cannot be used for establishing a single bidirectional communication link.

Specifically, the computer device may establish the single bidirectional communication link between a local end and a proxy server based on the application layer protocol. The local end is a local end of the computer device.

It may be understood that, the computer device transmits first content blocks through the single bidirectional communication link to the proxy server in a streaming manner. The proxy server returns second content blocks obtained after performing content type conversion on the first content blocks.

The proxy server may shunt the first content blocks to servers used for speech recognition. The proxy server may alternatively perform speech recognition on the first content blocks.

In this embodiment, the single bidirectional communication link is established between the local end and the proxy server based on the application layer protocol, to perform balanced distribution through the proxy server, thereby improving the properness of resource utilization. In addition, the accuracy and the processing efficiency of content processing can also be improved.

In an embodiment, the method may further include: performing protocol encapsulation on the TCP protocol or a multi-link application layer protocol, to generate the application layer protocol used for establishing the single bidirectional communication link.

In an embodiment, the computer device may perform protocol encapsulation on the TCP, to generate the application layer protocol used for establishing the single bidirectional communication link.

In an embodiment, the computer device may perform protocol encapsulation based on a TCP protocol or a multi-link application layer protocol, to generate the application layer protocol used for establishing the single bidirectional communication link.

The multi-link application layer protocol is an application layer protocol used for implementing bidirectional communication by establishing at least two links. That is, the multi-link application layer protocol itself cannot be used for establishing a single bidirectional communication link.

Specifically, in an embodiment, the computer device may perform protocol encapsulation on the TCP protocol or a multi-link application layer protocol, to generate an application layer protocol capable of implementing interaction between the client and the server.

In this embodiment, the establishing the single bidirectional communication link between a local end and a proxy server based on the application layer protocol includes: transmitting an uplink request and a downlink request to the proxy server; and combining and encapsulating the uplink request and the downlink request by using the application layer protocol, to generate the single bidirectional communication link between the local end and the proxy server.

The local end is a local end of the computer device or the local end may be referred to as the computer device itself. The uplink request is used for requesting establishment of a communication link for transmitting information from the client to a network. The downlink request is used for requesting establishment of a communication link for receiving, by the client, information from the network.

Specifically, the computer device may transmit an uplink request and a downlink request to the proxy server; transmit an uplink request and a downlink request to the proxy server; and combine and encapsulate the uplink request and the downlink request by using the application layer protocol, to generate the single bidirectional communication link between the local end and the proxy server. In this way, receiving and transmitting of the uplink and downlink data can be implemented through the single bidirectional communication link.

In an embodiment, while the stability of the single bidirectional communication link is kept, the computer device may receive an application interface adaptation instruction; and adapt an interface of at least one application at an access layer in response to the application interface adaptation instruction. In this way, various applications corresponding to the adapted interface can all receive and transmit data through the single bidirectional communication link, to achieve generalization, thereby improving adaptability.

In this embodiment, protocol encapsulation may be performed on an underlying protocol or an existing application layer protocol to generate an application layer protocol used for establishing a single bidirectional communication link, so as to generate a single bidirectional communication link, which is a novel solution different from using an existing application layer protocol to directly establish and extend a single bidirectional communication link, thereby improving applicability.

In an embodiment, the transmitting the first content blocks in a streaming manner according to a first sequence of obtaining the first content blocks includes: transmitting the first content blocks in a streaming manner to the proxy server according to the first sequence of obtaining the first content blocks, the first content blocks being used for instructing the proxy server to distribute the first content blocks to decoder servers. In an embodiment, the receiving, through the single bidirectional communication link, second content blocks returned in a streaming manner includes: receiving, through the single bidirectional communication link, the second content blocks returned by the proxy server in a streaming manner, the second content blocks being obtained by performing, by the decoder servers, content type conversion on the first content blocks.

The decoder server is a server that is responsible for performing content type conversion.

In an embodiment, the proxy server may directly distribute the first content blocks to the decoder servers. The proxy server may alternatively distribute the first content blocks to adapter servers, and the adapter servers shunt the first content blocks to the decoder servers.

The adapter servers are configured to logically adapt and convert data, and distribute adapted and converted content.

Figure 10:
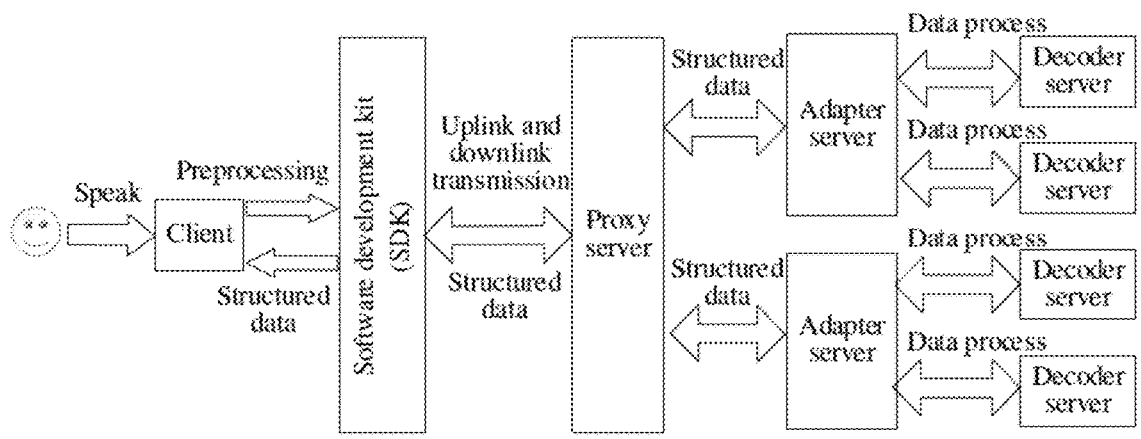
FIG. 10 is an example architectural block diagram of content processing according to an embodiment.

FIG. 10 is an architectural block diagram of content processing according to an embodiment. FIG. 10 is described by using an example in which an application scenario is speech recognition. Referring to FIG. 10, a user speaks, and a client acquires audio data, preprocesses and structures the audio data, to generate speech data blocks, and transfers the speech data blocks to an installed SDK. A single bidirectional communication link is established between the SDK and a proxy server. The speech data blocks are distributed to adapter servers through the single bidirectional communication link, and the adapter servers shunt the speech data blocks to decoder servers through data processes. The decoder servers perform speech recognition on the speech data blocks, to generate text content blocks, and return the text content blocks to the adapter servers through data processes. The adapter servers return the structured text content blocks to the proxy server. The proxy server returns the structured text content blocks to the SDK through the single bidirectional communication link, and further, transmits the structured text content blocks back to the client. That is, uplink transmission and downlink transmission are implemented through the single bidirectional communication link. The client may display the text content blocks. It may be understood that, during transmission of the speech data blocks, audio data is still being acquired. Therefore, the speech data blocks are transmitted in a streaming manner, and the text content blocks are returned in a streaming manner, to recognize a speech while the user speaks. In addition, transmitting of the speech data blocks and receiving of the text content blocks are asynchronously performed in the single bidirectional communication link.

In the foregoing embodiments, on a server end, a plurality of servers, such as a proxy server and a decoder server, cooperate to perform content processing, thereby improving the processing efficiency and the accuracy.

In an embodiment, the proxy server includes a first proxy server and a second proxy server; the first proxy server is a proxy server provided by a first object; the second proxy server is a proxy server provided by a second object; the first content blocks are obtained based on a client of the second object; the single bidirectional communication link is established between the client and the first proxy server based on the application layer protocol and an SDK provided by the first object;

In an embodiment, the first content blocks are further used to instruct the first proxy server to forward the first content blocks to the second proxy server and the second proxy server to distribute the first content blocks to the decoder servers.

It may be understood that, the first object is different from the second object. The first object is a service provider, that is, a tool used for providing a content processing method. The second object is equivalent to a business party, used for implementing the content processing method in the embodiments of this disclosure according to the SDK provided by the first object.

In an embodiment, the second object may be at least one of a content playback platform party, a smart home platform party, and an instant messaging platform party.

Specifically, the computer device pre-installs the SDK provided by the first object on the client provided by the second object. After receiving a trigger instruction, the computer device may establish, based on the application layer protocol and the installed SDK, a single bidirectional communication link between the client end and the first proxy server provided by the first object. The computer device may obtain first content blocks through the client, and transmit the first content blocks to the first proxy server through the single bidirectional communication link in a streaming manner. The first proxy server may forward the first content blocks to the second proxy server provided by the second object. The second proxy server further shunt the first content blocks to decoder servers for content type conversion.

It may be understood that, the second proxy server may directly transmit the first content blocks to the decoder servers for content type conversion. The second proxy server may alternatively distribute the first content blocks to adapter servers, and the adapter servers shunt, according to a load balancing principle, the first content blocks to the decoder servers for decoding.

Figure 11:
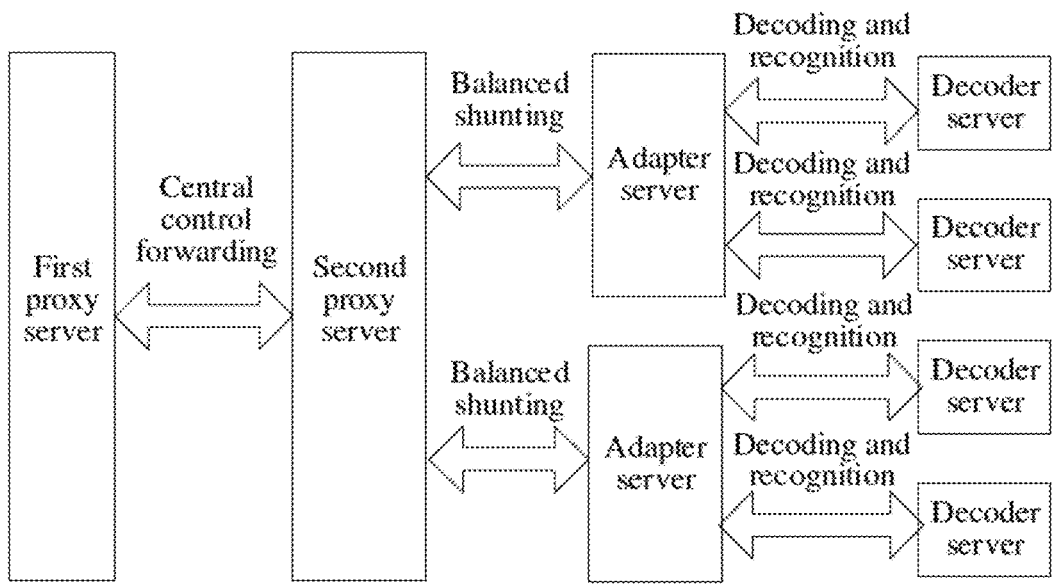
FIG. 11 is an example schematic diagram of central control forwarding according to an embodiment.

FIG. 11 is a schematic diagram of central control forwarding according to an embodiment. A first proxy server, as a central control center, forwards first content blocks in a central controlling manner to a second proxy server of a corresponding region and a corresponding business, and the second proxy server shunts the first content blocks in a balanced manner to adapter servers. The adapter servers perform logical adaptation, add data to a queue, and then, distribute the first content blocks to decoder servers corresponding to the business. The decoder servers perform decoding and recognition on the first content blocks, that is, perform content type conversion. Then, the decoder servers return second content blocks after the content type conversion through the adapter servers and the second proxy server sequentially to the first proxy server. Further, the first proxy server returns the second content blocks to a client through a single bidirectional communication link, and the client outputs the second content blocks sequentially.

In the foregoing embodiment, the first content blocks are forwarded to a proxy server (that is, the second proxy server) of a business party, and further, the proxy server of the business party performs distribution. On the one hand, it is equivalent to performing security management and control, to improve the security. On the other hand, the proxy server of the business party is enabled to perform distribution, which is equivalent to taking business characteristics into consideration, thereby improving the accuracy of content processing.

Figure 12:
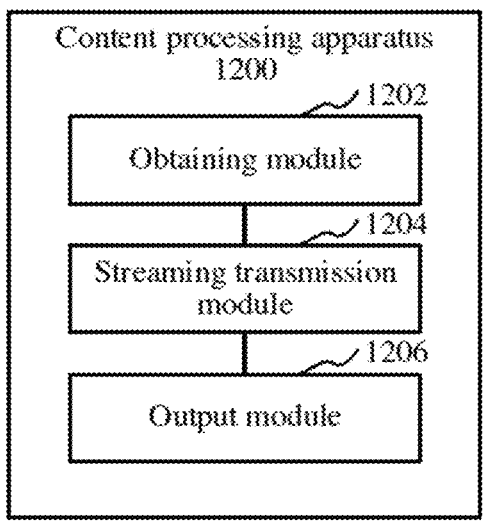
FIG. 12 is an example block diagram of a content processing apparatus according to an embodiment.

As shown in FIG. 12, in one embodiment, a content processing apparatus 1200 is provided, disposed in a computer device. The computer device may be a terminal or a server. The apparatus 1200 includes: an obtaining module 1202, a streaming transmission module 1204, and an an output module 1206. In this disclosure, the term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The obtaining module 1202 is configured to obtain first content blocks, the first content block being structured data.

The streaming transmission module 1204 is configured to transmit, through a single bidirectional communication link established based on an application layer protocol, the first content blocks in a streaming manner according to a first sequence of obtaining the first content blocks; and receive, through the single bidirectional communication link, second content blocks returned in a streaming manner, the second content blocks being obtained by performing content type conversion on the first content blocks, transmitting of the first content blocks and receiving of the second content blocks being asynchronously performed in the single bidirectional communication link.

The output module 1206 is configured to output the second content blocks sequentially according to a second sequence of receiving the second content blocks.

In an embodiment, the obtaining module 1202 is further configured to receive a trigger instruction; obtain initial content in response to the trigger instruction; and structure the initial content, to generate first content blocks.

In an embodiment, the trigger instruction is a speech recognition instruction, and the obtaining module 1202 is further configured to acquire audio data in response to the speech recognition instruction; extract target speech data from the acquired audio data; and structure the target speech data, to generate speech data blocks as the first content blocks.

In an embodiment, the second content blocks are text content blocks obtained by performing speech recognition on the speech data blocks; and the output module 1206 is further configured to display the text content blocks sequentially on an interface according to the second sequence of receiving the text content blocks.

In an embodiment, the output module 1206 is further configured to: splice and combine the displayed second content blocks according to the second sequence, to generate a search statement; search, according to the search statement, for media content matching the search statement; and display the found media content.

In an embodiment, the trigger instruction is a TTS instruction; and the obtaining module 1202 is further configured to obtain entered text content in response to the TTS instruction; and structuring the text content, to generate text content blocks as the first content blocks.

In an embodiment, the second content blocks are speech data blocks obtained by performing TTS on the text content blocks; and the output module 1206 is further configured to play the speech data blocks sequentially according to the second sequence of receiving the speech data blocks.

Figure 13:
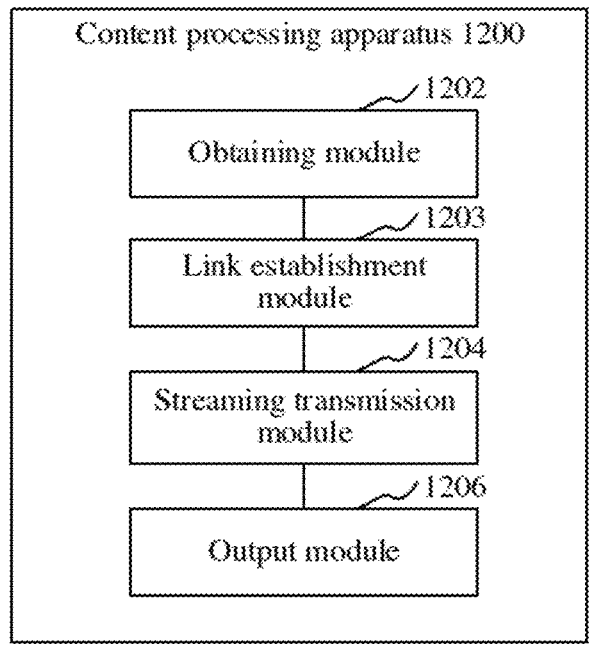
FIG. 13 is an example block diagram of a content processing apparatus according to another embodiment.

As shown in FIG. 13, in an embodiment, the apparatus 1200 further includes:

a link establishment module 1203, configured to obtain the application layer protocol; and establish the single bidirectional communication link between a local end and a proxy server based on the application layer protocol, the single bidirectional communication link being a single link used for performing bidirectional streaming communication.

In an embodiment, the link establishment module 1203 is further configured perform protocol encapsulation based on the TCP protocol or a multi-link application layer protocol, to generate the application layer protocol used for establishing the single bidirectional communication link; transmit an uplink request and a downlink request to the proxy server; and combine and encapsulate the uplink request and the downlink request by using the application layer protocol, to generate the single bidirectional communication link between the local end and the proxy server.

In an embodiment, the streaming transmission module 1204 is further configured to transmit the first content blocks in a streaming manner to the proxy server according to the first sequence of obtaining the first content blocks, the first content blocks being used for instructing the proxy server to distribute the first content blocks to decoder servers; and receive, through the single bidirectional communication link, the second content blocks returned by the proxy server in a streaming manner, the second content blocks being obtained by performing, by the decoder servers, content type conversion on the first content blocks.

In an embodiment, the proxy server includes a first proxy server and a second proxy server; the second proxy server is a proxy server of a business party; the first content blocks are obtained based on a client of the business party; the first content blocks are further used to instruct the first proxy server to forward the first content blocks to the second proxy server and the second proxy server to distribute the first content blocks to the decoder servers.

In the content processing apparatus, first content blocks belonging to structured data are transmitted in a streaming manner in a single bidirectional communication link established based on an application layer protocol, and second content blocks returned in a streaming manner are received, the second content blocks being obtained by performing content type conversion on the first content blocks. The second content blocks are sequentially outputted according to a second sequence of receiving the second content blocks. Because transmitting of the first content blocks and receiving of the second content blocks are asynchronously performed in the single bidirectional communication link, so that bidirectionally transmitting structured content in a streaming manner in a same communication link, compared with binary data, requires no additional data conversion, thereby saving system resources.

For a specific limitation on the content processing apparatus, refer to the limitation on the content processing method above. Details are not described herein again. The modules in the foregoing content processing apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

Figure 14:
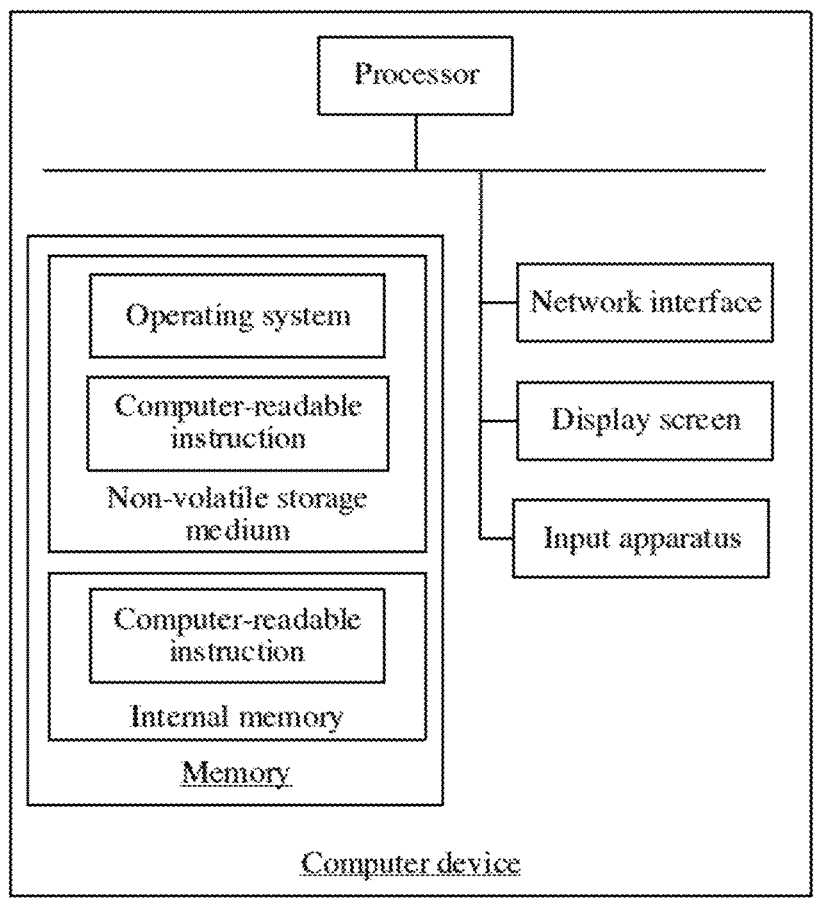
FIG. 14 is an example block diagram of a computer device according to an embodiment.

FIG. 14 is a block diagram of a computer device according to an embodiment. Referring to FIG. 14, the computer device may be the terminal 110 in FIG. 1. The computer device includes one or more processors, a memory, a network interface, a display screen, and an input apparatus that are connected by using a system bus. The memory includes a non-transitory storage medium and an internal memory. The non-transitory storage medium of the computer device may store an operating system and computer readable instructions. When the computer-readable instructions are executed, the one or more processor may be caused to perform a content processing method. The one or more processors of the computer device are configured to provide calculation and control capabilities, to support running of the entire computer device. The internal memory may store computer-readable instructions, the computer-readable instructions, when executed by the one or more processors, causing the one or more processors to perform a content processing method. The network interface of the computer device is configured to perform network communication. The display screen of the computer device may be a liquid crystal display screen or an electronic ink display screen. The input apparatus of the computer device may be a touch layer covering the display screen, or may be a button, a trackball, or a touch panel disposed on a housing of a terminal, or may be an external keyboard, a touch panel or a mouse. The computer device may be a personal computer, a smart speaker, a mobile terminal, or an in-vehicle device. The mobile terminal includes at least one of a mobile phone, a tablet computer, a personal digital assistant, a wearable device, or the like.

A person skilled in the art may understand that the structure shown in FIG. 14 is only a block diagram of a partial structure related to the solution of this application, and does not limit the computer device to which the solution of this disclosure is applied. Specifically, the computer device may include more or less components than those shown in the figure, or some components may be combined, or different component deployment may be used.

In one embodiment, the content processing apparatus provided in this disclosure may be implemented in a form of computer-readable instructions. The computer-readable instructions may be run on the computer device shown in FIG. 14. The non-transitory storage medium of the computer device may store various program modules constituting the content processing apparatus, for example, an obtaining module 1202, a streaming transmission module 1204, and an an output module 1206 shown in FIG. 12 The computer-readable instructions constituted by the program modules are used for causing the computer device to perform steps of the content processing method in the embodiments of this disclosure described in this specification.

For example, the computer device may obtain first content blocks by using the obtaining module 1202 of the content processing apparatus 1200 shown in FIG. 12, the first content block being structured data. The computer device may transmit, by using the streaming transmission module 1204 through a single bidirectional communication link established based on an application layer protocol, the first content blocks in a streaming manner according to a first sequence of obtaining the first content blocks; and receive, through the single bidirectional communication link, second content blocks returned in a streaming manner, the second content blocks being obtained by performing content type conversion on the first content blocks, transmitting of the first content blocks and receiving of the second content blocks being asynchronously performed in the single bidirectional communication link. The computer device may output, by using the output module 1206, the second content blocks sequentially according to a second sequence of receiving the second content blocks.

In an embodiment, a computer device is provided, including a memory and one or more processors, the memory storing computer-readable instructions, the computer-readable instructions, when executed by the one or more processors, causing the one or more processors to perform steps of the content processing method. The steps of the content processing method may be steps of the content processing method in the foregoing embodiments.

In an embodiment, one or more non-transitory computer-readable storage mediums are provided, storing computer-readable instructions, the computer-readable instructions, when executed by one or more processors, causing the one or more processor to perform steps of the content processing method. The steps of the content processing method may be steps of the content processing method in the foregoing embodiments.

"First", "second", and the like in the embodiments of this disclosure are merely used for distinction, and are not intended to constitute a limitation in aspects of a size, an order, subordination, or the like. "A plurality of" in the embodiments of this disclosure means at least two.

It is to be understood that although the steps in the embodiments of this disclosure are not necessarily performed sequentially in a sequence indicated by step numbers. Unless otherwise explicitly specified in this disclosure, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages for the another step.

A person of ordinary skill in the art may understand that all or some of the procedures of the methods in the foregoing embodiments may be implemented by a computer-readable instruction instructing relevant hardware. The program may be stored in a non-transitory computer-readable storage medium. When the program runs, the procedures of the foregoing method embodiments are performed. References to the memory, the storage, the database, or other medium used in the embodiments provided in this disclosure may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink (Synchlink) DRAM (SL-DRAM), a rambus (Rambus) direct RAM (RDRAM), a direct rambus dynamic RAM (DRDRAM), and a rambus dynamic RAM (RDRAM).

Technical features of the foregoing embodiments may be randomly combined. To make description concise, not all possible combinations of the technical features in the foregoing embodiments are described. However, the combinations of the technical features shall be considered as falling within the scope recorded by this specification provided that no conflict exists.

The foregoing embodiments only describe several implementations of this disclosure specifically and in detail, but cannot be construed as a limitation to the patent scope of this disclosure. For a person of ordinary skill in the art, several transformations and improvements can be made without departing from the idea of this disclosure. The transformations and improvements belong to the protection scope of this disclosure. Therefore, the protection scope of this disclosure shall be subject to the appended claims.

What is claimed is:

1. A content processing method, performed by a computer device, the method comprising:
    obtaining first content blocks comprising structured data by obtaining initial content in response to a trigger instruction and structuring the initial content, to generate the first content blocks;
    obtaining an application layer protocol; and
    establishing a single bidirectional communication link between the computer device and proxy servers based on the application layer protocol, the single bidirectional communication link being a single link used for performing bidirectional streaming communication, the proxy servers comprising a first proxy server provided by a first object, and a second proxy server provided by a second object, the first content blocks being obtained based on a client of the second object;
    transmitting the first content blocks in a streaming manner to proxy servers according to a first sequence of obtaining the first content blocks to instruct the proxy servers to distribute the first content blocks to decoder servers;
    distributing, through the single bidirectional communication link established based on the application layer protocol, the first content blocks to one or more processing servers according to the first sequence and using a processing load balancing shunt process in the proxy servers;
    receiving, through the single bidirectional communication link, second content blocks returned in the streaming manner by the one or more processing servers, the second content blocks being obtained by performing content type conversion on the first content blocks by the decoder servers, transmission of the first content blocks and reception of the second content blocks being asynchronously performed via the single bidirectional communication link; and outputting the second content blocks sequentially according to a second sequence, the second sequence being a sequence of receiving the second content blocks, wherein the single bidirectional communication link is established between the client and the first proxy server based on the application layer protocol and a software development kit (SDK) provided by the first object, and the first content blocks are further used to instruct the first proxy server to forward the first content blocks to the second proxy server and instruct the second proxy server to distribute the first content blocks to the decoder servers.

2. The method according to claim 1, wherein structuring the initial content, to generate the first content blocks comprises:

preprocessing the initial content to extract target content from the initial content, the target content being content of a content type to be converted; and structuring the target content to generate the first content blocks.

3. The method according to claim 2, wherein:

the trigger instruction comprises a speech recognition instruction;

obtaining the initial content in response to the trigger instruction comprises acquiring audio data in response to the speech recognition instruction;

preprocessing the initial content to extract the target content from the initial content comprises extracting target speech data from the acquired audio data; and structuring the target content, to generate the first content blocks comprises structuring the target speech data, to generate speech data blocks as the first content blocks.

4. The method according to claim 3, further comprising displaying a speech recognition trigger control, wherein acquiring the audio data in response to the speech recognition instruction comprises:

in response to a speech recognition instruction generated by triggering the speech recognition trigger control being received, jumping to a speech search interface to acquire the audio data; and establishing the single bidirectional communication link based on the application layer protocol.

5. The method according to claim 3, wherein:

the second content blocks comprise text content blocks obtained by performing speech recognition on the speech data blocks; and outputting the second content blocks sequentially according to the second sequence comprises displaying the text content blocks sequentially on the interface according to the second sequence, the second sequence being a sequence of receiving the text content blocks.

6. The method according to claim 5, further comprising:

splicing and combining the displayed second content blocks according to the second sequence to generate a search statement;

searching, according to the search statement, for media content matching the search statement; and displaying the searched media content.

7. The method according to claim 1, wherein:

the trigger instruction comprises an instruction for text to speech (TTS) conversion;

obtaining the initial content in response to the trigger instruction comprises, in response to the TTS instruction, obtaining input text content as the initial content; and structuring the initial content to generate the first content blocks comprises structuring the input text content, to generate text content blocks as the first content blocks.

8. The method according to claim 7, wherein:

the second content blocks comprise speech data blocks obtained by performing TTS conversion on the text content blocks; and outputting the second content blocks sequentially according to the second sequence comprises playing the speech data blocks sequentially according to the second sequence, the second sequence being a sequence of receiving the speech data blocks.

9. The method according to claim 8, wherein:

the speech data blocks are obtained through a speech data block generation operation; and the speech data block generation operation comprises synthesizing speech data blocks based on the text content blocks to match sound characteristics of a preset sound template.

10. The method according to claim 1, wherein:

the method further comprises performing protocol encapsulation based on either a Transmission Control Protocol (TCP) protocol or a multi-link application layer protocol to generate the application layer protocol used for establishing the single bidirectional communication link; and establishing the single bidirectional communication link between the computer device and the proxy servers based on the application layer protocol comprises:

transmitting an uplink request and a downlink request to the proxy servers; and combining and encapsulating the uplink request and the downlink request by using the application layer protocol to generate the single bidirectional communication link between the local end and the proxy servers.

11. The method according to claim 1, further comprising:

receiving an adaptation instruction for adapting an interface of an application; and adapting the interface at an access layer in response to the adaptation instruction, the application corresponding to the adapted interface being an application used for receiving and transmitting data through the single bidirectional communication link.

12. One or more non-transitory computer-readable storage mediums, storing a computer program, the computer program, when executed by one or more processors, causing the one or more processors to perform operations of the method according to claim 1.

13. A content processing apparatus comprising a memory for storing computer instructions and a processor in communication with the memory and configured to executed the computer instructions to:

obtain first content blocks comprising structured data by obtaining initial content in response to a trigger instruction and structuring the initial content, to generate the first content blocks;

obtain an application layer protocol; and establish a single bidirectional communication link between the computer device and proxy servers based on the application layer protocol, the single bidirectional communication link being a single link used for performing bidirectional streaming communication, the proxy servers comprising a first proxy server provided by a first object, and a second proxy server provided by a second object, the first content blocks being obtained based on a client of the second object;

transmit the first content blocks in a streaming manner to proxy servers according to a first sequence of obtaining the first content blocks to instruct the proxy servers to distribute the first content blocks to decoder servers;

distribute, through the single bidirectional communication link established based on the application layer protocol, the first content blocks in a streaming manner to one or more processing servers according to the first sequence for obtaining the first content blocks and using a processing load balancing shunt process in the proxy servers;

receive, through the single bidirectional communication link, second content blocks returned in the streaming manner, the second content blocks being obtained by performing content type conversion on the first content blocks by the decoder servers, transmission of the first content blocks and reception of the second content blocks being asynchronously performed via the single bidirectional communication link; and output the second content blocks sequentially according to a second sequence for receiving the second content blocks, wherein the single bidirectional communication link is established between the client and the first proxy server based on the application layer protocol and a software development kit (SDK) provided by the first object, and the first content blocks are further used to instruct the first proxy server to forward the first content blocks to the second proxy server and instruct the second proxy server to distribute the first content blocks to the decoder servers.

14. The apparatus according to claim 13, wherein to distribute the first content blocks, the processor is configured to execute the computer instructions to:

transmit the first content blocks in a streaming manner to the proxy servers according to the first sequence of obtaining the first content blocks, the first content blocks being used for instructing the proxy servers to distribute the first content blocks to decoder servers; and receive, through the single bidirectional communication link, the second content blocks returned from the one or more processing servers via the proxy servers in a streaming manner, the second content blocks being obtained by performing, by the decoder servers, content type conversion on the first content blocks.

15. The apparatus according to claim 13, wherein the process is further configured to execute the instructions to:

perform protocol encapsulation based on either of the Transmission Control Protocol (TCP) protocol and a multi-link application layer protocol to generate the application layer protocol used for establishing the single bidirectional communication link;

transmit an uplink request and a downlink request to the proxy servers; and combine and encapsulate the uplink request and the downlink request by using the application layer protocol to generate the single bidirectional communication link between the local end and the proxy servers.

16. The apparatus according to claim 13, wherein the processor is further configured to execute the computer instructions to:

receive an adaptation instruction for adapting an interface of an application; and adapt the interface at an access layer in response to the adaptation instruction, the application corresponding to the adapted interface being an application used for receiving and transmitting data through the single bidirectional communication link.

* * * * *